US005994840A

United States Patent [19]

Forsdyke et al.

[11] Patent Number: 5,994,840

[45] Date of Patent: Nov. 30, 1999

[54] CONTROLLING THE TRANSMISSION OF LIGHT FROM LIGHT SOURCES

[75] Inventors: Graham M. Forsdyke; Stuart A. Mucklejohn, both of Leicestershire, United Kingdom

[73] Assignee: General Electric Company, Schenectady, N.Y.

[21] Appl. No.: 08/799,713

[22] Filed: Feb. 12, 1997

[30] Foreign Application Priority Data

Feb. 15, 1996 [GB] United Kingdom .................. 9603198

[51] Int. Cl.[6] ............................ H01J 17/16; H01J 61/35; B60Q 1/00; B60Q 1/64

[52] U.S. Cl. ........................ 313/635; 313/112; 313/493; 313/573; 313/634; 313/635; 362/61; 362/318; 359/265

[58] Field of Search .................................. 313/110, 112, 313/113, 117, 358, 483, 489, 493, 573, 74, 634–35; 362/34, 318, 61, 80, 214, 277, 280, 319, 343; 359/265, 273–75

[56] References Cited

U.S. PATENT DOCUMENTS

| | | | |
|---|---|---|---|
| 3,961,253 | 6/1976 | Brych | 313/358 |
| 4,019,809 | 4/1977 | Otake et al. | 313/483 X |
| 4,080,548 | 3/1978 | Johnson | 313/316 X |
| 4,086,003 | 4/1978 | Kouchi et al. | 313/483 X |
| 4,248,517 | 2/1981 | Nishikawa | 313/117 X |
| 4,264,150 | 4/1981 | Yano et al. | 350/357 |
| 4,554,587 | 11/1985 | Ooi et al. . | |
| 4,664,934 | 5/1987 | Ito et al. . | |
| 5,255,163 | 10/1993 | Neumann | 362/61 |
| 5,517,389 | 5/1996 | Myers | 362/318 X |

FOREIGN PATENT DOCUMENTS

| | | |
|---|---|---|
| 0 660 375 A2 | 6/1995 | European Pat. Off. . |
| 2 605 086 A1 | 4/1988 | France . |
| WO 94/11777 | 5/1994 | WIPO . |

OTHER PUBLICATIONS

Patent Abstracts of Japan.
Database WPI.
European Search Report.

*Primary Examiner*—Nimeshkumar D. Patel
*Assistant Examiner*—Mack Haynes
*Attorney, Agent, or Firm*—Fay, Sharpe, Beall, Fagan, Minnich & McKee, LLP.

[57] ABSTRACT

The envelope (6) of a light source is at least partly coated with electrochromic material (20), sandwiched between two conductive layers (21,22). A voltage applied to the electrochromic material by way of the conductive layers varies the intensity and/or color of the light from the source.

18 Claims, 1 Drawing Sheet

CONTROLLING THE TRANSMISSION OF LIGHT FROM LIGHT SOURCES

The present invention relates to lamps.

Preferred embodiments of the invention concernfluorescent lamps.

It is very well known to control the output of light from an incandescent lamp using a dimmer circuit. It is also known to apply a colored coating to an incandescent lamp to define the color of light.

Fluorescent lamps are very difficult to dim. However, by suitable choice of phosphor, the color of the light produced can be determined without resort to colored coatings.

It is known from U.S. Pat. No. 4,664,934 to provide an electrochromic dimmer for e.g. a sun-roof or a rear view mirror of an automobile. The dimmer comprises an electrochromic layer sandwiched between a pair of electrodes.

According to the present invention, there is provided a lamp having an envelope containing a light source, the envelope being at least partially coated with material the light transmission of which varies with applied voltage, the lamp further comprising means for applying a voltage to the material.

If the lamp is an incandescent lamp the light source is a tungsten filament.

If the lamp is a fluorescent lamp the light source is the phosphor, fill and electrodes.

Many types of lamps comprise the said envelope, which is an outer envelope, enclosing a further, inner envelope, of the light source.

In a presently preferred embodiment of the invention, the lamp is an electrodeless fluorescent lamp such as described in EP-A-660,375 (PQ 619).

Figure 1:
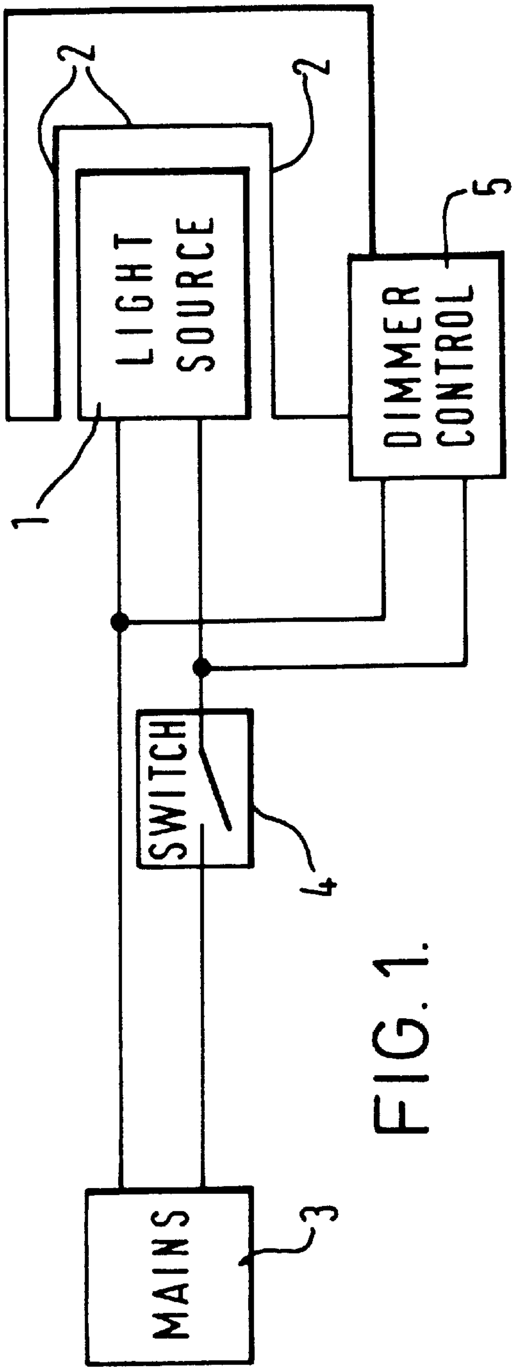
Figure 2:
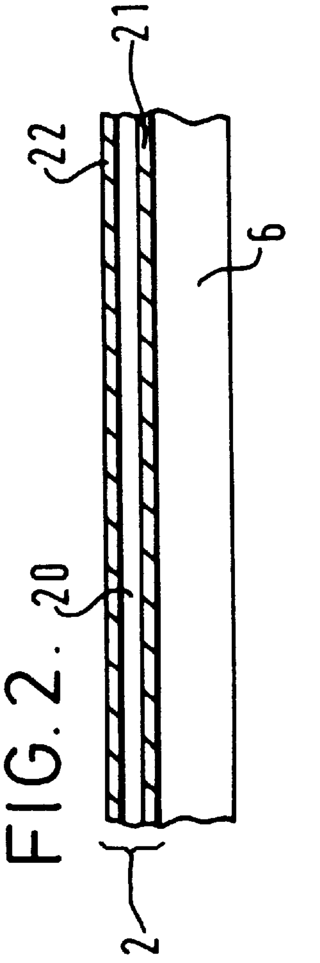

For a better understanding of the present invention, reference will now be made by way of example to the accompanying drawings, in which:

FIG. 1 is a schematic circuit diagram of a lamp circuit for a lamp in accordance with the invention, FIG. 2 is a partial sectional view of a lamp in accordance with the invention.

Referring to FIG. 1, the light source 1 may be:

a) an incandescent lamp such as a GLS lamp, b) a fluorescent lamp c) a compact fluorescent lamp preferably having an outer envelope d) an electrodeless fluorescent lamp such as GENURA (Trade Mark) made and sold by General Electric Company or as described in EP-A-660375.

If the light source 1 is a fluorescent lamp it includes a suitable ballast.

At least a part of the light transmissive envelope and preferably the whole of the light transmissive envelope of the source is provided with a coating 2 comprising electrochromic material. Suitable electrochromic materials include:

Iron (111) hexacyanoferrate

Pheanthro (9,10-c) thiophene

Polyaniline and its substituted derivatives and most transition metal oxides with intercalated small mobile ions such as Li, Na or K.

The material may be held in an inert host matrix.

The light source 1 is connected to the mains 3 via a switch 4 in conventional manner. A dimmer control circuit 5 powered from the mains provides a variable low voltage (e.g. 5–12 volts max) to the coating 2 on the light source 1 for varying the light transmission of the coating.

The dimmer may comprise a simple potentiometer coupled to the mains by a step-down transformer which also isolates the coating 2 from the mains. Other circuits based on electronic dimmers are apparent to those skilled in the art. Alternatively the dimmer may be battery powered.

Referring to FIG. 2, the coating 2 is applied to the envelope 6 of the light source 1.

The coating 2 comprises for example a layer 20 of the aforesaid electrochromic material sandwiched between layers 21 and 22 of light transmissive electrically conductive material.

The layer 21 and/or 22 may be in the form of a sheet or may be in the form of a lattice.

In the case of an electrodeless fluorescent lamp as described for instance in EP-A-673057 (PQ 642/610) the layer 21 directly contacting the envelope is a conductive coating provided to confine an RF field within the envelope.

We claim:

1. A lamp having a light transmissive envelope containing a light source, the envelope being at least partially coated with material the light transmission of which varies with voltage applied thereto, the lamp further comprising means for applying a voltage to the material.

2. A lamp according to claim 1 wherein the said material comprises an electrochromic material.

3. A lamp according to claim 2, wherein the said electrochromic material is selected from the group comprising:

Iron (111) hexacyanoferrate

Pheanthro (9,10-c) thiophene and

Polyaniline and substituted derivatives thereof.

4. A lamp according to claim 2, wherein the said electrochromic material comprises a transition metal oxide with intercalated small mobile ions.

5. A lamp according to claim 4, wherein the ions are one of Li, Na and K.

6. A lamp according to claim 1 wherein the applying means comprises at least one electrode connected to the said material.

7. A lamp according to claim 6, wherein the electrode comprises a light transmissive conductive layer on the material.

8. A lamp according to claim 1 further comprising means for producing a variable voltage.

9. A lamp comprising:

a light source;

a light transmissive envelope surrounding the light source;

the envelope being at least partially coated with material the light transmission of which varies with voltage applied thereto; and an electrode connected to the material for conducting a voltage from an associated voltage source thereto.

10. The lamp according to claim 9 wherein the material comprises an electrochromic material.

11. The lamp according to claim 10 wherein the electrochromic material is selected from the group comprising:

iron (111) hexacyanoferrate pheanthro (9, 10-c) thiophene and polyanaline and substituted derivatives thereof.

12. The lamp according to claim 10 wherein the electrochromic material comprises a transitional metal oxide with intercalated small mobile ions.

13. The lamp according to claim 12 wherein the ions are one of Li, Na, and K.

14. The lamp according to claim 9 further comprising an assembly for producing a variable voltage.

15. The lamp according to claim 9 wherein the light source includes a filament.

16. The lamp according to claim 9 wherein the light source includes a fill received in the envelope that is selectively energized and a phosphor coating on the envelope for converting radiation from the energized fill to visible light.

17. The lamp of claim 16 wherein the light source include first and second electrodes for energizing the fill.

18. The lamp of claim 16 wherein the material is a conductive coating layer confining an RF field within the envelope.

* * * * *